(12) United States Patent
Heseding

(10) Patent No.: US 12,090,893 B2
(45) Date of Patent: Sep. 17, 2024

(54) BRAKING SYSTEM OF A MOTOR VEHICLE AND METHOD FOR CONTROLLING THE SAME

(71) Applicant: ZF CV Systems Global GmbH, Bern (CH)

(72) Inventor: Johannes Heseding, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/507,840

(22) Filed: Nov. 13, 2023

(65) Prior Publication Data

US 2024/0075818 A1 Mar. 7, 2024

Related U.S. Application Data

(63) Continuation of application No. PCT/EP2022/064230, filed on May 25, 2022.

(30) Foreign Application Priority Data

Jun. 7, 2021 (DE) ...................... 10 2021 114 497.3

(51) Int. Cl.
*B60L 7/26* (2006.01)
*B60L 15/20* (2006.01)
(Continued)

(52) U.S. Cl.
CPC ............ *B60L 7/26* (2013.01); *B60L 15/2009* (2013.01); *B60T 7/042* (2013.01); *B60T 13/586* (2013.01); *B60W 50/16* (2013.01); *B60L 2250/26* (2013.01)

(58) Field of Classification Search
CPC . B60T 1/087; B60T 1/093; B60T 1/10; B60T 8/4081–409; B60T 10/00–04;
(Continued)

(56) References Cited

U.S. PATENT DOCUMENTS 5,441,335 A * 8/1995 Stumpe ................. B60T 13/585
303/3
5,496,098 A * 3/1996 Brearley ................. B60T 13/66
303/9
(Continued)

FOREIGN PATENT DOCUMENTS

DE 198 52 399 A1 5/2000
DE 102008012636 A1 * 9/2009 .......... B60L 15/2009
(Continued)

OTHER PUBLICATIONS

EPO machine translation of JP 07-228242 A (original JP document published Aug. 29, 1995 (Year: 1995).*
(Continued)

*Primary Examiner* — David A Testardi
(74) *Attorney, Agent, or Firm* — Walter Ottesen, P.A.

(57) ABSTRACT

A braking system includes a service braking system having friction brakes actuatable by a pressure medium, an endurance braking system realized as a hydrodynamic or electrodynamic retarder, an electric machine connected to the wheels on an axle and operatable as a generator, and a foot-brake valve actuatable via a brake pedal. The braking-force demand signaled via a displacement of the pedal is satisfied, in order of priority, by the electric machine in generator operating mode, the retarder, and the service braking system. The distribution of the braking force to the components is communicated to a driver. To inform the driver about the distribution of the braking force, without this requiring the driver to look away from the traffic area ahead, in the case of a change in distribution of braking force, a haptically perceptible signal force is briefly superimposed, via the actuator, on a restoring force acting upon the pedal.

10 Claims, 2 Drawing Sheets

(51) Int. Cl.
*B60T 7/04* (2006.01)
*B60T 13/58* (2006.01)
*B60W 50/16* (2020.01)

(58) Field of Classification Search
CPC ............. B60T 13/585; B60T 13/586; B60T 2270/604; B60L 7/00–28; B60L 15/2009; B60W 50/16
See application file for complete search history.

(56) References Cited

U.S. PATENT DOCUMENTS

| | | | |
|---|---|---|---|
| 6,120,115 A * | 9/2000 | Manabe | B60W 30/18127 303/162 |
| 6,353,786 B1 * | 3/2002 | Yamada | B60K 6/46 903/906 |
| 6,354,671 B1 | 3/2002 | Feldmann et al. | |
| 6,378,636 B1 * | 4/2002 | Worrel | B60T 17/221 180/65.25 |
| 9,463,698 B2 * | 10/2016 | Severinsky | B60W 10/08 |
| 2004/0251095 A1 * | 12/2004 | Simard | B60T 13/586 188/1.11 E |
| 2008/0042489 A1 * | 2/2008 | Lewis | B60T 1/10 303/152 |
| 2008/0283024 A1 * | 11/2008 | Gregorio | B60W 50/16 123/399 |
| 2008/0303340 A1 * | 12/2008 | Crombez | B60T 13/746 60/545 |
| 2009/0179486 A1 * | 7/2009 | Ikeda | B60L 50/13 303/3 |
| 2010/0006380 A1 * | 1/2010 | Futahashi | B60L 15/2009 188/159 |
| 2010/0252378 A1 | 10/2010 | Hllberer | |
| 2013/0133965 A1 * | 5/2013 | Books | B60W 10/06 180/165 |
| 2014/0324316 A1 * | 10/2014 | Yao | B60T 13/585 701/70 |
| 2015/0001914 A1 * | 1/2015 | Antao | B60W 10/196 303/3 |
| 2017/0158183 A1 | 6/2017 | Hecker et al. | |
| 2017/0166062 A1 * | 6/2017 | Simonini | B60T 7/042 |
| 2018/0297613 A1 * | 10/2018 | Moia | B60T 7/042 |
| 2019/0299944 A1 | 10/2019 | Nilsson et al. | |
| 2020/0122728 A1 * | 4/2020 | Murase | B60L 7/18 |
| 2020/0139819 A1 * | 5/2020 | Kurosaki | B60L 7/18 |
| 2020/0317060 A1 * | 10/2020 | Dunning | B60T 8/3255 |
| 2021/0197842 A1 * | 7/2021 | Michaelsen | B60W 10/04 |
| 2021/0245720 A1 * | 8/2021 | Kava | B62D 37/02 |
| 2022/0009460 A1 * | 1/2022 | Nishiura | B60T 13/662 |
| 2022/0134888 A1 * | 5/2022 | Ko | B60L 15/2009 303/3 |
| 2022/0194232 A1 * | 6/2022 | Lu | B60L 7/18 |
| 2022/0258708 A1 * | 8/2022 | Hanslik | B60L 7/18 |

FOREIGN PATENT DOCUMENTS

| | | | | |
|---|---|---|---|---|
| DE | 102012209157 A1 * | 12/2013 | | B60L 3/04 |
| DE | 102012220770 A1 * | 5/2014 | | B60T 1/10 |
| DE | 10 2014 112 014 A1 | 2/2016 | | |
| DE | 11 2007 000 071 B4 | 12/2016 | | |
| DE | 102016013103 A1 * | 5/2017 | | |
| DE | 102016206786 A1 * | 10/2017 | | |
| DE | 102018114848 A1 * | 12/2019 | | |
| DE | 10 2019 216 525 A1 | 5/2020 | | |
| DE | 102019206655 A1 * | 11/2020 | | B60K 26/021 |
| EP | 860337 A2 * | 8/1998 | | B60T 8/00 |
| EP | 2314486 A1 * | 4/2011 | | B60T 1/10 |
| JP | 07228242 A * | 8/1995 | | |
| JP | 2002315104 A * | 10/2002 | | |
| JP | 2016175503 A * | 10/2016 | | |
| JP | 2019018646 A * | 2/2019 | | |
| WO | WO-2017029017 A1 * | 2/2017 | | B60T 1/10 |

OTHER PUBLICATIONS

EPO machine translation of DE 102008012636 A1 (original DE document published Sep. 10, 2009) (Year: 2009).*

EPO machine translation of DE 102018114848 A1 (original DE document published Dec. 24, 2019) (Year: 2019).*

English translation and Written Opinion of the International Searching Authority dated Oct. 18, 2022 for international application PCT/EP2022/064230 on which this application is based.

International Search Report of the European Patent Office dated Oct. 18, 2022 for international application PCT/EP2022/064230 on which this application is based.

* cited by examiner

BRAKING SYSTEM OF A MOTOR VEHICLE AND METHOD FOR CONTROLLING THE SAME

CROSS-REFERENCE TO RELATED APPLICATIONS

This application is a continuation application of international patent application PCT/EP2022/064230, filed May 25, 2022, designating the United States and claiming priority from German application 10 2021 114 497.3, filed Jun. 7, 2021, and the entire content of both applications is incorporated herein by reference.

TECHNICAL FIELD

The disclosure relates to a braking system of a motor vehicle and to a method for controlling this braking system, which motor vehicle has a service braking system having friction brakes that can be actuated by a pressure medium, an endurance braking system, realized as a hydrodynamic or electrodynamic retarder, at least one electric machine that is connected in a transmitting manner to the wheels on a vehicle axle and can be operated at least as a generator, and a foot-brake valve that can be actuated via a brake pedal, wherein the foot-brake valve has a braking-value transmitter and a brake-pedal actuator for generating a restoring force acting upon the brake pedal, and in which the components of the braking system can be controlled via an electronic control device, wherein the braking-force demand signaled via a displacement of the brake pedal is satisfied, in order of priority, by the electric machine in generator operating mode, by the retarder and by the service braking system, and wherein the distribution of the braking force to the components of the braking system is communicated to a driver of the motor vehicle in a suitable manner.

BACKGROUND

Heavy commercial vehicles, in addition to having a service braking system including friction brakes actuated by a pressure medium, usually also have a non-wearing endurance brake in the form of a hydrodynamic or electrodynamic retarder, by which the vehicle can be decelerated without use of the friction brakes. When a retarder is used, the kinetic energy of the respective vehicle is converted to heat, which is dissipated into the ambient air by suitable cooling equipment. The braking force of a retarder depends on the travel speed of the vehicle, or on the rotational speed of the transmission shaft, for example a gearbox output shaft of a stepped gearbox, to which a rotor of the retarder is connected in a transmitting manner. The usable braking force of a retarder is limited by the amount of heat that can be dissipated, such that it may be necessary to activate the friction brakes to prevent the retarder from overheating. In addition, a motor vehicle cannot be braked to a standstill via a retarder, such that the friction brakes must be activated, at the latest, when the vehicle reaches or drops below a minimum travel speed.

With the increasing electrification of vehicles, commercial vehicles are also each being equipped, as purely electric vehicles or hybrid vehicles, with at least one electric machine that is connected in a transmitting manner to the wheels on a vehicle axle, can be operated as an engine and as a generator, and can thus also be used as a non-wearing endurance brake in generator operating mode. When an electric machine is in generator operating mode, the kinetic energy of the vehicle is converted to electrical energy that can be used in a so-called recuperation operating mode to charge an electric energy store. In the case of an electric machine, the usable braking force is limited, on the one hand, by the amount of heat that can be dissipated and, on the other hand, by the capacity of the energy store, which is why it may be necessary to activate the retarder and/or the friction brakes in order to avoid overheating of the electric machine or overcharging of the energy store.

In the case of an electronically controllable braking system having an integrated endurance brake of the type just described, the amount of deceleration requested by a driver through a displacement of the brake pedal and detected via a braking-value transmitter arranged on the foot-brake valve is distributed to the braking system in dependence on a fixed order of priority and current operating parameters such as the travel speed, the operating temperature of the retarder or of the electric machine, as well as the state of charge of the electric energy store (brake blending). The order of priority in this case is usually determined in such a way that, during a braking operation, the electric machine in generator operating mode is used first to decelerate the vehicle in order to charge the electric energy store, the retarder is then activated as required, and lastly the service braking system with the friction brakes is used to decelerate the vehicle as required. Since the driver of the motor vehicle expects in each case the same characteristic of the resistance force on the brake pedal irrespective of the distribution of the braking force to the components of the braking system, there is usually a brake-pedal actuator that is operatively connected to the brake pedal and via which a restoring force is in each case generated and directed into the brake pedal. This restoring force is rated in such a way that, together with resistance forces generated within the foot-brake valve, such as the spring force of a restoring spring acting upon the brake pedal and/or the pressure force of the pressure medium acting upon a control piston, there ensues on the brake pedal a resistance force that corresponds to the total braking force.

Known from US 2009/0179486 is a braking system of a hybrid vehicle, which includes a service braking system having friction brakes that can be actuated hydraulically, and electric machines that are connected in a transmitting manner to the wheels of a vehicle and that can be operated as engines and as generators, as well as a foot-brake valve that can be actuated via a brake pedal, and a braking-value transmitter, realized as a pressure sensor, that is connected to a main brake line. The drive train of the hybrid vehicle has an internal combustion engine, which is coupled to an electric generator. The hybrid vehicle is driven by the electric machines in engine operating mode and braked in generator operating mode. The electrical energy generated by the electric machines in generator operating mode is converted into heat in a heat radiator and discharged to the ambient air. During braking operations, the hybrid vehicle, in dependence on the displacement of the brake pedal, in addition to being decelerated by the friction brakes of the service braking system, is also decelerated by the electric machines operated as generators. During braking operations with only slight displacement of the brake pedal, however, it is provided that the hybrid vehicle is braked only by the friction brakes of the service braking system, in order to ensure that the braking force can be applied with precision.

US 2004/0251095 A1 describes a braking system of an electric vehicle including a service braking system having friction brakes that can be actuated hydraulically, and an electric machine that is connected in a transmitting manner to the wheels of a vehicle axle and that can be operated as an engine and as a generator, as well as a main brake valve that can be actuated via a brake pedal, a braking-value transmitter arranged on a brake lever of the brake pedal, and a brake-pedal actuator for generating a restoring force acting upon the brake pedal. In a first embodiment, the brake-pedal actuator is realized as an electric motor that is connected in an actuating manner to the brake lever via a rack-and-pinion gearing. In a second embodiment, the brake-pedal actuator is realized as a hydraulic or pneumatic actuating cylinder, the piston rod of which is connected in an actuating manner to the brake lever. During braking operations, the braking force requested through the displacement of the brake pedal is distributed between the friction brakes of the service braking system and the electric machine operated as a generator. In this case, a restoring force is generated via the brake-pedal actuator and directed into the brake lever, this restoring force corresponding to the proportion of the braking force generated by the generator, such that the driver perceives the same restoring force on the brake pedal as in the case of a braking operation that is effected purely hydraulically.

Disclosed in DE 10 2012 209 157 A1 is a braking system of an electric or hybrid vehicle, which includes a service braking system having friction brakes that can be actuated via a pressure medium, at least one electric machine, which is connected in a transmitting manner to the wheels of a vehicle axle and can be operated as an engine and as a generator, as well as a foot-brake valve that can be actuated via a brake pedal, having a braking-value transmitter and a brake-pedal actuator for generating a restoring force acting upon the brake pedal. During braking operations, the motor vehicle is decelerated first by the electric machine operated as a generator. Before the electric machine reaches its maximum braking torque, the service braking system with the friction brakes is activated. In a closed-loop control means, a restoring force, set via the brake-pedal actuator, is determined in dependence on the displacement of the brake pedal and the maximum or currently available or recuperable braking torque of the electric machine. Before the electric machine reaches its maximum braking torque, the service braking system with the friction brakes is activated, this being brought to the attention of the driver of the vehicle by an increased restoring force upon the brake pedal.

Known from DE 10 2018 114 848 A1 is a foot-brake valve of an electronically controllable compressed-air braking system, which has a braking-value transmitter, realized as a displacement sensor, and an electropneumatic brake-pedal actuator for generating a restoring force acting upon the brake pedal. The brake-pedal actuator is flange-mounted, adjacent to a spring collar, via an open pressure chamber that can be supplied with air via an inlet valve and vented via an outlet valve, onto the housing of the foot-brake valve. The spring collar is guided in an axially displaceable manner in the housing of the foot-brake valve and serves primarily to support a restoring spring, bearing oppositely against which is a plunger piston that can be displaced axially via the brake pedal. A restoring force that is increased portionally or by increments can be directed into the brake pedal via the brake-pedal actuator. During a braking operation with ABS control activated, pressure pulses can be directed into the brake pedal via the brake-pedal actuator, these pulses being perceptible by the driver as a vibration and being intended to indicate the currently operative ABS control.

In a motor vehicle that has a braking system including a service braking system having friction brakes, a retarder and at least one electric machine that can be operated as a generator, the distribution of the braking force to the components of the braking system may be shown to the driver during a braking operation, for example on a display in the dashboard. The driver can then influence the braking operation by actuating the brake pedal in such a way that, for example, the actuation of the friction brakes of the service braking system, and thus wear on the friction linings, as well as on the brake disks or brake drums, is avoided. However, since drivers should not look away from the traffic area ahead during a major braking operation, in order to keep the motor vehicle on the roadway, to prevent a collision with another motor vehicle or to avoid an obstacle, additional information about the current distribution of the braking force, that can be felt haptically on the brake pedal, is desirable.

SUMMARY

It is an object of the disclosure to provide a braking system and a method for controlling a braking system of a motor vehicle, by which the distribution of the driver's braking intention to the components of the braking system can be communicated to the driver in a suitable manner. Furthermore, a braking system by which the method can be operated is to be represented and described.

The object relating to the method is, for example achieved by a method for controlling a braking system of a motor vehicle having a vehicle axle and a plurality of wheels on the vehicle axle, the braking system having a plurality of components including a service braking system, an endurance braking system, and at least one electric machine, the service braking system having friction brakes being configured to be actuated by a pressure medium, the endurance braking system being configured as a hydrodynamic or electrodynamic retarder, the at least one electric machine being connected in a transmitting manner to the plurality of wheels on the vehicle axle and configured to be operated at least as a generator, and a foot-brake valve configured to be actuated via a brake pedal, wherein the foot-brake valve has a braking-value transmitter and a brake-pedal actuator for generating a restoring force acting upon the brake pedal, components of the braking system are controllable via an electronic control device, wherein a braking-force demand is satisfied, in order of priority, by the electric machine in generator operating mode, by the retarder and by the service braking system, and wherein a distribution of a braking force to the plurality of components of the braking system is communicated to a driver of the motor vehicle in a suitable manner. The method includes: in an event of at least one change in the distribution of the braking force to the components of the braking system, superimposing a haptically perceptible signal force on the restoring force acting upon the brake pedal via the brake-pedal actuator.

Further disclosed is a braking system of a motor vehicle, which has a service braking system having friction brakes that can be actuated by a pressure medium, an endurance braking system, realized as a hydrodynamic or electrodynamic retarder, at least one electric machine that is connected in a transmitting manner to the wheels on a vehicle axle and can be operated at least as a generator, and a foot-brake valve that can be actuated via a brake pedal, wherein the foot-brake valve has a braking-value transmitter and a brake-pedal actuator for generating a restoring force acting upon the brake pedal, and in which the components of the braking system can be controlled via an electronic control device, wherein the signaled braking-force demand is satisfied, in order of priority, by the electric machine in generator operating mode, by the retarder and by the service braking system, and wherein the distribution of the braking force to the components of the braking system can be communicated to a driver of the motor vehicle in a suitable manner.

To achieve the aforementioned object relating to the braking system, it is provided in the case of this braking system that the brake-pedal actuator is configured to operate electrically and has a rotatable or axially displaceable transmission element, and that the transmission element of the brake-pedal actuator is directly or indirectly connected in an actuating manner to a brake lever of the brake pedal or to a plunger piston of the foot-brake valve.

In an embodiment, the braking force is signaled via a displacement of the brake pedal. In another embodiment, the braking-force demand is signaled automatically by the electronically closed-loop-controlled braking requests. For example, in advanced braking systems such as ESP (Electronic Stability Program), ESC (Electronic Stability Control), ASR (Anti-Slip Regulation), the vehicle deceleration and/or braking-force demand can be managed or calibrated independently of the driver's braking intention indicated by a displacement of the brake pedal.

Compared to the embodiments, known from the prior art, as a hydraulic or pneumatic actuating cylinder, this configuration as an electrically operating brake-pedal actuator has the advantages of a better, or faster, response behavior and the possibility of a more precise modulation of the restoring force and of the signal force acting upon the brake pedal.

According to a first embodiment of this braking system, the brake-pedal actuator is realized as an electric motor having a rotatable rotor shaft. Here, the rotor shaft of the electric motor is directly or indirectly connected to the brake lever of the brake pedal or to the plunger piston of the foot-brake valve via a spindle gearing.

As an alternative to this, it may be provided that the brake-pedal actuator is realized as an electromagnet having an axially displaceable armature, the armature of the electromagnet being directly or indirectly connected in an actuating manner to the brake lever of the brake pedal or to the plunger piston of the foot-brake valve.

Accordingly, the disclosure relates firstly to a method for controlling a braking system of a motor vehicle, which has a service braking system having friction brakes that can be actuated by a pressure medium, an endurance braking system, realized as a hydrodynamic or electrodynamic retarder, at least one electric machine that is connected in a transmitting manner to the wheels on a vehicle axle and can be operated at least as a generator, and a foot-brake valve that can be actuated via a brake pedal, wherein the foot-brake valve has a braking-value transmitter and a brake-pedal actuator for generating a restoring force acting upon the brake pedal, and in which the components of the braking system can be controlled via an electronic control device, wherein the braking-force demand signaled via a displacement of the brake pedal is satisfied, in order of priority, by the electric machine in generator operating mode, by the retarder and by the service braking system, and wherein the distribution of the braking force to the components of the braking system is communicated to a driver of the motor vehicle in a suitable manner.

To achieve the object relating to the method, it is provided in the case of this braking system that, in the case of at least one change in the distribution of the braking force to the components of the braking system, a haptically perceptible signal force is briefly superimposed, via the brake-pedal actuator, on the restoring force acting upon the brake pedal.

The advantage here is that the driver of the motor vehicle is only informed over a very short period of time about a change in the distribution of the braking force to the components of the braking system, that is, no permanent change in the restoring force acting upon the brake pedal is noticeable. Moreover, since this communication of information acts on the driver's foot via the brake pedal, the driver can continue to focus on the traffic area ahead.

According to a first embodiment of the method described, upon at least one of the components of the braking system being activated or deactivated, a haptically perceptible signal force is briefly superimposed, via the brake-pedal actuator, on the restoring force acting upon the brake pedal. The advantages just mentioned also apply to this method variant. In the case of this embodiment of the method, however, it is only when one of the components of the braking system is fully activated or fully deactivated that the driver is informed via the additional signal force acting upon the brake pedal.

As a result of a haptically perceivable signal force being generated via the brake-pedal actuator and directed into the brake pedal, the driver of the motor vehicle is informed about a change in the distribution of the braking force to the components of the braking system that is currently being effected or has just been effected, thus, for example, about the activation or deactivation of the electric machine in its generator operating mode, of the retarder or of the service braking system. Since this information is signaled to the driver's foot via the brake pedal, the driver does not need to look away from the traffic area ahead in order to take note of the information. In response to the signal force, the driver can influence the distribution of the braking force to the aforementioned components of the braking system by an appropriate actuation of the brake pedal. Thus, for example, during electric braking when the electric machine is in generator operating mode, the driver can prevent the activation of the retarder by slightly releasing the brake pedal in an energy-efficient manner, provided that the traffic situation allows for a lesser braking deceleration.

In this case, it may be advantageous for the perceptibility of the current distribution of the braking force to the components of the braking system if the signal force altering the restoring force upon the brake pedal acts as at least a pulse-type increase in the restoring force.

To enable a distinction to be made between the activating and deactivating of the components of the braking system during a braking operation, it is preferably provided that the pulse-type signal forces applied for different changes in the distribution of the braking force differ from one another in respect of their number and/or strength and/or duration. This will be discussed in the explanation of an embodiment.

According to a further method variant, it is provided that the signal force is applied in the form of an oscillation sequence that can be felt as a vibration on the brake pedal and includes a plurality of oscillations of the restoring force. In the case of this implementation of the signal force, the oscillation sequences applied for different changes in the distribution of the braking force may differ from one another in respect of their frequency and/or amplitude and/or duration.

Clearly, the method variants may also be used in combination, for example in such a way that the activation or deactivation of at least one component of the braking system, for example the electric machine that can be operated as a generator, is signaled via a signal force in the form of at least a pulse-type increase in the restoring force. In contrast, the activation or deactivation of another component of the braking system, for example of the service braking system with the friction brakes, is brought to the driver's attention via a signal force in the form of an oscillation sequence that can be felt as a vibration and includes a plurality of oscillations of the restoring force.

BRIEF DESCRIPTION OF DRAWINGS

The invention will now be described with reference to the drawings wherein.

DETAILED DESCRIPTION

Figure 1:
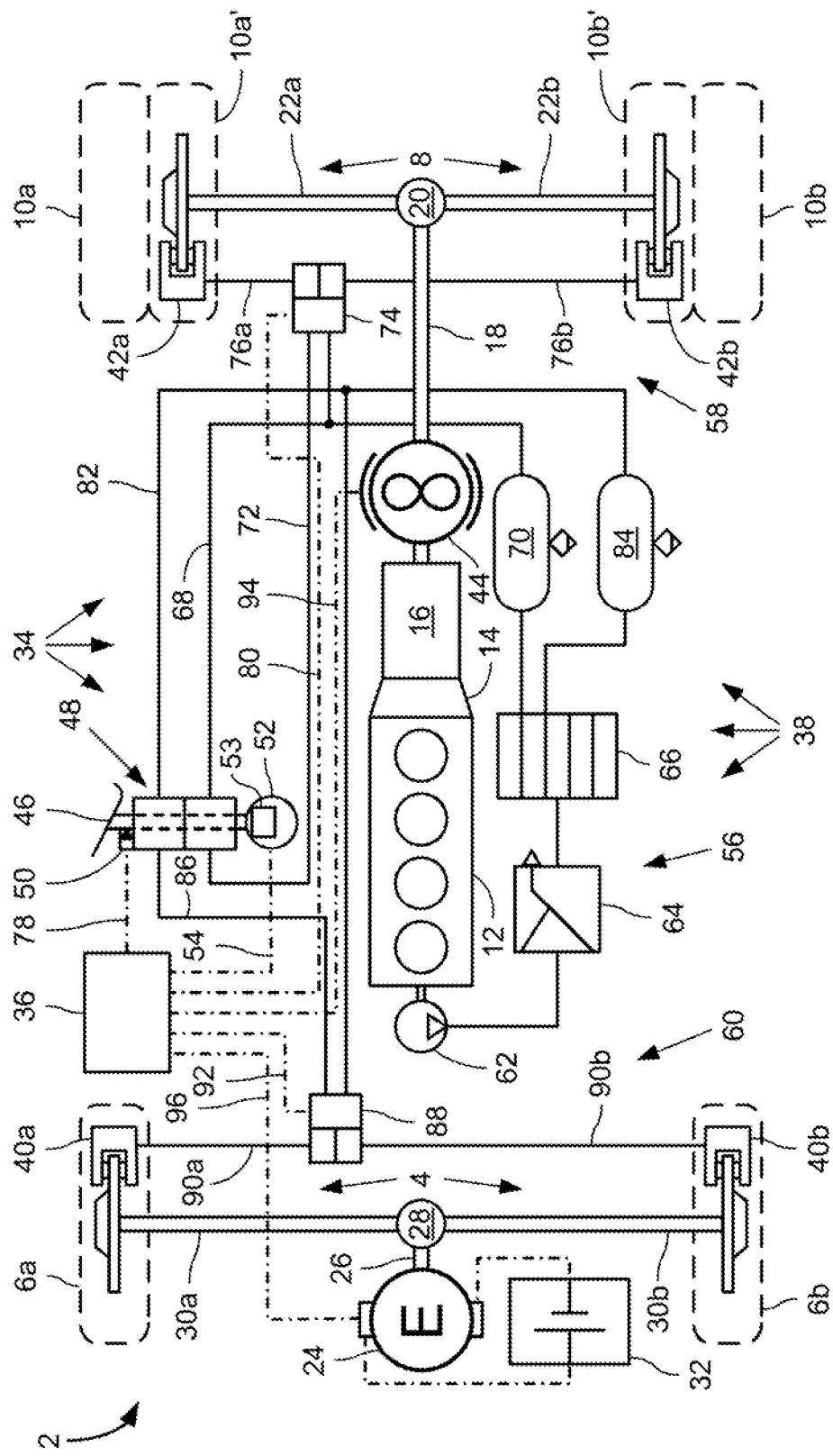
FIG. 1, in a schematic view, shows a motor vehicle having a braking system according to the disclosure; and, FIG. 2 shows a force-time diagram illustrating the characteristic of a braking operation with use of the control method according to the disclosure.

The motor vehicle 2 illustrated in FIG. 1, which is a commercial vehicle, has a single-tired front axle 4 having two wheels 6a, 6b, and a double-tired rear axle 8 having a total of, for example, four wheels 10a, 10a', 10b, 10b'. The motor vehicle 2 may be driven optionally or jointly by an internal combustion engine 12 and/or by an electric machine 24 that can be operated optionally as an engine or as a generator. The internal combustion engine 12 is connected in a driving manner to the wheels 10a, 10a', 10b, 10b' of the rear axle 8 via a disconnect-type clutch 14, a stepped gearbox 16, a cardan shaft 18, a first axle differential 20 and a respective drive shaft 22a, 22b. The electric machine 24 is connected in a driving manner to the wheels 6a, 6b of the front axle 4 via a transmission shaft 26, a second axle differential 28 and a respective drive shaft 30a, 30b. In engine operating mode, the electric machine 24 is supplied with electrical energy from an associated electric energy store 32. In generator operating mode, the electric machine 24 is preferably used to charge the energy store 32.

The braking system 34 of the motor vehicle 2 can be controlled electronically and includes, in addition to an electronic control device 36, a service braking system 38 having wheel brakes 40a, 40b, 42a, 42b in the form of friction brakes that can be actuated by a pressure medium, an endurance braking system or secondary brake 44 in the form of a hydrodynamic or electrodynamic retarder, the electric machine 24 connected in a driving manner to the wheels 6a, 6b of the front axle 4, as well as a foot-brake valve 48 that can be actuated via a brake pedal 46 and can be directly or indirectly connected to a braking-value transmitter 50 in the form of a positioning-travel sensor and to a brake-pedal actuator 52. The brake-pedal actuator 52 serves to generate a restoring force acting upon the brake pedal 46. For its operation, it is connected to the electronic control device 36 via an electric control line 54. Arranged on the brake-pedal actuator 52 there is an axially or rotationally acting transmission element 53, via which a signal force can be exerted upon the brake pedal 46, in addition to the aforementioned restoring force.

The service braking system 38 is in the form of a compressed-air braking system and includes a compressed-air supply means 56 and two brake circuits 58, 60. The compressed-air supply means 56 includes a compressor 62, a pressure regulator 64 and a multi-circuit protection valve 66. The compressor 62 can be driven by the internal combustion engine 12. Via the compressor 62, compressed air is conveyed into the two brake circuits 58, 60 via the pressure regulator 64 and the multi-circuit protection valve 66.

The first brake circuit 58 has a first pressure accumulator 70 and a first supply line 68, which leads from the multi-circuit protection valve 66 to the foot-brake valve 48. Connected to the foot-brake valve 48 is a first axle-brake line 72, into which a brake pressure is applied in dependence on the actuation of the brake pedal 46. The first axle-brake line 72 leads to a first axle-valve module 74 on the rear axle 8.

The first axle-valve module 74 includes a relay valve and in each case preferably one ABS valve arrangement, not represented, per wheel pair 10a, 10a'; 10b, 10b' of the rear axle 8. It is to be noted that the presence of the ABS valve arrangement of the first axle-valve module 74 is only an optional embodiment, in particular if the first axle-valve module 74 has been realized as a valve module that can be operated electronically. From the first axle-valve module 74 there is a respective wheel-brake line 76a, 76b routed to the associated wheel brake 42a, 42b of the rear axle 8. The relay valve of the first axle-valve module 74 is controlled electronically, primarily in dependence on the braking value detected via the braking-value transmitter 50 of the foot-brake valve 48. For this purpose, the braking-value transmitter 50 is connected, via an electric sensor line 78, to the electronic control device 36, and the first axle-valve module 74 is connected to the latter via an electric control line 80. In the case of redundancy, that is, if the electronic controller fails, the relay valve of the first axle-valve module 74 is controlled pneumatically in dependence on the brake pressure present in the axle-brake line 72.

The second brake circuit 60 has a second supply line 82 and a second pressure accumulator 84, the second supply line 82 being routed from the multi-circuit protection valve 66, via the second pressure accumulator 84, to the foot-brake valve 48. A second axle-brake line 86, into which a brake pressure is applied in dependence on the actuation of the brake pedal 46, extends from the foot-brake valve 48 to a second axle-valve module 88. This second axle-valve module 88 likewise includes a relay valve, not represented, and a respective ABS valve arrangement per wheel 6a, 6b of the front axle 4. From the ABS valve arrangements of the second axle-brake valve module 88 there is a respective wheel-brake line 90a, 90b routed to the associated wheel brake 40a, 40b of the front axle 4. The relay valve of the second axle-valve module 88 is likewise controlled electronically, primarily in dependence on the braking value detected via the braking-value transmitter 50 of the foot-brake valve 48, and for this purpose is connected to the electronic control device 36 via an electric control line 92.

In the case of redundancy, the relay valve of the second axle-valve module 88 is likewise controlled pneumatically in dependence on the brake pressure present in the second axle-brake line 86.

The retarder 44 is connected in a driving manner to an output shaft of the stepped gearbox 16 and is connected in a driving manner to the wheels 10a, 10a', 10b, 10b' of the rear axle 8 via the cardan shaft 18, the axle differential 20 and the drive shafts 22a, 22b. For electronic control, the retarder 44 is connected to the electronic control device 36 via an electric control line 94. Likewise, the electric machine 24 is connected to the electronic control device 36 via an electric control line 96.

In a braking operation, the braking deceleration wanted by the driver, which corresponds to the braking value detected by the braking-value transmitter 50 upon an actuation of the brake pedal 46, is distributed in the electronic control device 36 to the components of the braking system 34. As mentioned, these are the service braking system 38, the retarder 44 and the electric machine 24 in generator operating mode, the distribution of the braking force being effected in the order of priority of electric machine 24, retarder 44 and service braking system 38.

In this way, the motor vehicle 2 is first braked, without wear, by the electric machine 24 operated as a generator, with partial recovery of the kinetic energy of the motor vehicle 2 and charging of the electric energy store 32 (recuperation). The motor vehicle 2 is then braked further, without wear, by the retarder 44 before the friction brakes 40a, 40b, 42a, 42b of the service braking system 38 are actuated. In an embodiment, it is also conceivable for the distribution, or planning, or sequencing or prioritization of the aforementioned braking components (service braking system 38, the retarder 44 and the electric machine 24 in generator operating mode) in relation to the application of the braking force to be decided (for example, by the electronic control device 36) in dependence on the detected amount of braking wanted by the driver. Since, for a particular displacement of the brake pedal 46, the driver should perceive largely the same resistance force $F_{BP}$ on the brake pedal 46 irrespective of the distribution of the braking force to the components 24, 38, 44 of the braking system 34, in an embodiment a corresponding restoring force, in the form of a signal force, is generated via the axially or rotationally acting transmission element 53 at the brake-pedal actuator 52 and is introduced into the brake pedal 46.

In another embodiment, feedback to the driver is provided by an increased sensation of resistance or resistance force on the brake pedal 46 or foot-brake valve 48 when, for a particular displacement of the brake pedal 46, the driver is to be informed or must be informed, at the brake pedal 46 or foot-brake valve 48, of the distribution of braking force to the components 24, 38, 44. It should be taken into consideration in this regard that the displacement of the brake pedal 46 does not always reflect a wanted vehicle deceleration. For example, in advanced braking systems such as ESP (Electronic Stability Program), ESC (Electronic Stability Control), ASR (Anti-Slip Regulation), vehicle deceleration and/or braking-force demand can be controlled independently of the driver's braking intention.

In order to inform the driver, if necessary in addition to a visual indication in a display in the dashboard of the motor vehicle 2, about the distribution of the braking force to the components 24, 38, 44 of the braking system 34, it is provided according to the disclosure that, in the case of at least one change in the distribution of the braking force to the components 24, 38, 44 of the braking system 34, for example upon one of the components 24, 38, 44 of the braking system 34 being activated and/or deactivated, a brief signal force that can be perceived haptically on the driver's foot is superimposed on the restoring force via the brake-pedal actuator 52. How this is preferably effected is represented by way of example in the diagram in FIG. 2.

Figure 2:
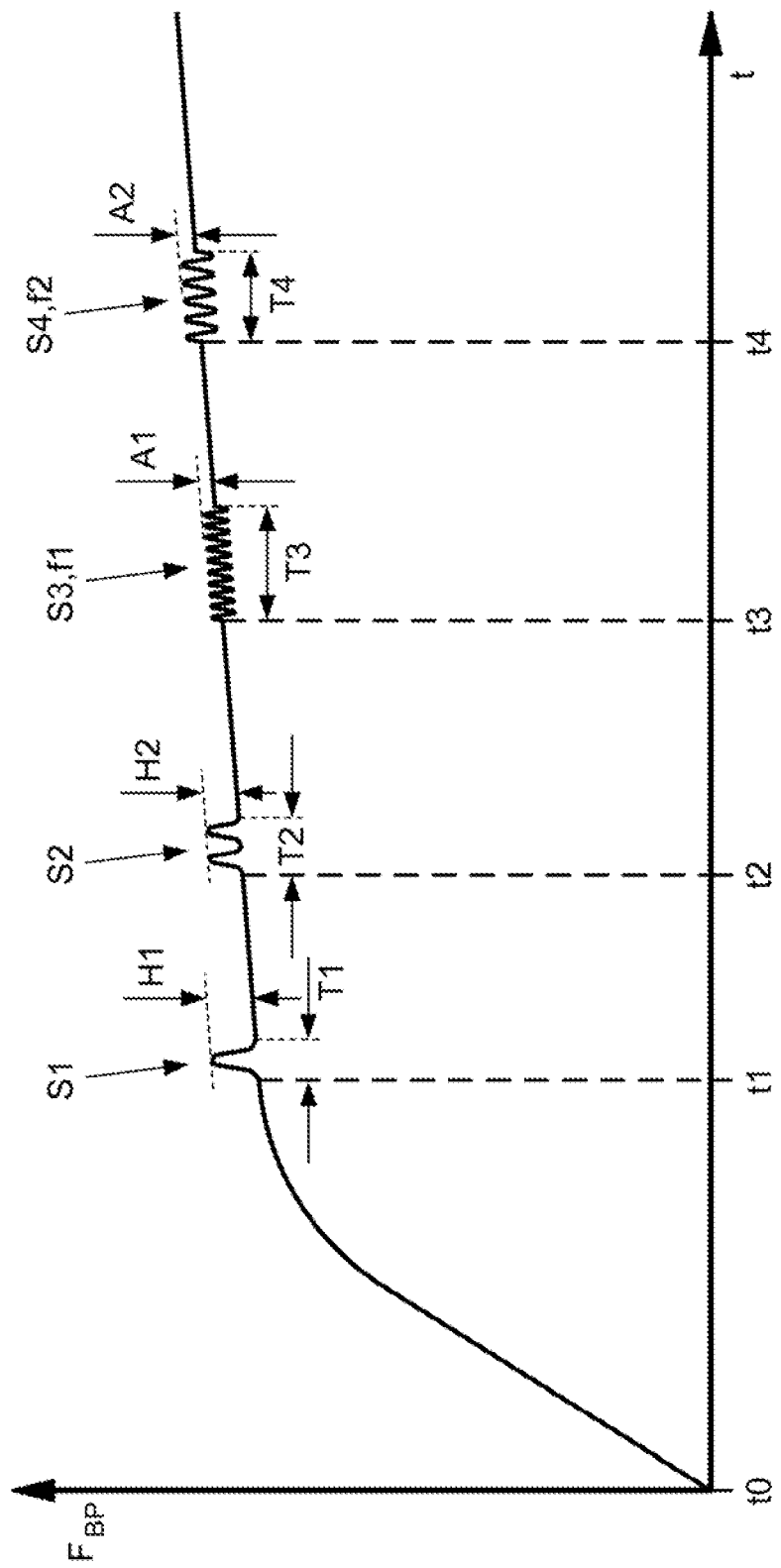

Represented in the diagram in FIG. 2 is the characteristic of the resistance force $F_{BP}$ acting upon the brake pedal 46, over time t, during a braking operation ($F_{BP}$(t)). The resistance force $F_{BP}$ results from the sum of the resistance forces generated within the foot-brake valve 48 and of the restoring force applied via the foot-brake actuator 52. The braking operation begins at the time point t0 with an actuation of the brake pedal 46 by the driver, the motor vehicle 2 being initially decelerated only by the electric machine 24 operated as a generator. At the time point t1, the retarder 44 is activated, this being indicated to the driver by a haptically perceptible signal force S1 in the form of a pulse-type increase in the restoring force, having the strength H1 and the duration T1.

The braking torque of the electric machine 24 is then continuously reduced and the braking torque of the retarder 44 is increased accordingly until the electric machine 24 is deactivated completely at the time point t2. The deactivating of the electric machine 24 is communicated to the driver by a haptically perceptible signal force S2 in the form of a double-pulse-type increase in the restoring force, having the strength H2 and the duration T2. In the present case, as an example, the strength H2 of the second signal force S2 is recognizably lower than the strength H1 of the first signal force S1, and the duration T2 of the second signal force S2 is greater than the duration T1 of the first signal force S1 (H2<H1, T2>T1). Deactivation of the electric machine 24 and activation of the retarder 44 may be required, for example, because the electric energy store 32 is largely charged and/or the electric machine 24 has reached its overheating limit.

At the time point t3, the service braking system 38 with the friction brakes 40a, 40b, 42a, 42b is activated, this being indicated to the driver by a haptically perceptible signal force S3 in the form of an oscillation sequence, having the amplitude A1, the frequency f1 and the duration T3, that can be felt as a vibration and includes a plurality of oscillations of the restoring force. The braking torque of the retarder 44 is continuously reduced, and the braking torque of the friction brakes 40a, 40b, 42a, 42b is correspondingly increased, by an increase in the applied braking pressure, until the retarder 44 is deactivated completely at the time point t4.

The deactivating of the retarder 44 is communicated to the driver by a haptically perceptible signal force S4 in the form of an oscillation sequence, having the amplitude A2, the frequency f2 and the duration T4, that can be felt as a vibration and includes a plurality of oscillations of the restoring force.

In the present case, as an example, the amplitude A2 of the fourth signal force S4 is greater than the amplitude A1 of the third signal force S3, the frequency f2 of the fourth signal force S4 is less than the frequency f1 of the third signal force S3, and the duration T4 of the fourth signal force S4 is less than the duration T3 of the third signal force S3 (A2>A1, f2<f1, T4<T3). The deactivation of the retarder 44 and the activation of the service braking system 38 may be necessary, for example, because the retarder 44 can no longer generate usable braking torque due to a reduced travel speed of the motor vehicle 2 and/or has reached its overheating limit.

The signal forces S1, S2, S3, S4, which are superimposed on the restoring force and are applied to the brake pedal 46 via the transmission element 53 on the brake-pedal actuator 52, inform the driver about the respective operations relating to the distribution of the braking force, such as the activating of the retarder 44 or of the service braking system 38, or the deactivating of the electric machine 24 or of the retarder 44, without the driver having to look away from the traffic area ahead. Due to the different types of the signal forces S1, S2, S3, S4, the respective activation and deactivation operations can be unambiguously identified. If there is no emergency braking, the driver can influence the distribution of the braking force to the components 24, 38, 44 of the braking system 38 by actuating the brake pedal 46, for example by partially releasing the brake pedal 46 to return to the previous distribution of the braking force.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

2 motor vehicle, commercial vehicle
4 vehicle axle, front axle
6a, 6b wheels on the front axle
8 vehicle axle, rear axle
10a, 10a' wheels on the rear axle, right side of vehicle
10b, 10b' wheels on the rear axle, left side of vehicle
12 internal combustion engine
14 disconnect-type clutch
16 stepped gearbox
18 cardan shaft
20 axle differential on the rear axle
22a, 22b drive shafts on the rear axle
24 electric machine
26 transmission shaft
28 axle differential on the front axle
30a, 30b drive shafts on the front axle
32 energy store, battery
34 braking system
36 electronic control device
38 service braking system
40a, 40b wheel brakes, friction brakes on the front axle
42a, 42b wheel brakes, friction brakes on the rear axle
44 endurance braking system, retarder
46 brake pedal
48 foot-brake valve
50 braking-value transmitter, positioning-travel sensor
52 brake-pedal actuator
53 transmission element on the brake-pedal actuator
54 first control line
56 compressed-air supply means
58 first brake circuit
60 second brake circuit
62 compressor
64 pressure regulator
66 multi-circuit protection valve
68 first supply line
70 first pressure accumulator
72 first axle-brake line
74 first axle-valve module
76a, 76b wheel-brake lines
78 second sensor line
80 third control line
82 second supply line
84 second pressure accumulator
86 second axle-brake line
88 second axle-valve module
90a, 90b wheel-brake lines
92 fourth control line
94 fifth control line
96 sixth control line
A1 amplitude of the signal force S3
A2 amplitude of the signal force S4
ECU electronic control device
f1 frequency of the signal force S3
f2 frequency of the signal force S4
$F_{BP}$ resistance force
H1 strength of the signal force S1
H2 strength of the signal force S2
S1 signal force, increase in restoring force
S2 signal force, increase in restoring force
S3 signal force, oscillation sequence
S4 signal force, oscillation sequence
t time
t0 time point, start time point
t1 first time point
T1 duration of the signal force S1
t2 second time point
T2 duration of the signal force S2
t3 third time point
T3 duration of the signal force S3
t4 fourth time point
T4 duration of the signal force S4

The invention claimed is:

1. A braking system of a motor vehicle having a vehicle axle and a plurality of wheels on said vehicle axle, the braking system comprising:
   a service braking system having friction brakes configured to be actuated by a pressure medium;
   an endurance braking system configured as a hydrodynamic or electrodynamic retarder;
   at least one electric machine connected in a transmitting manner to the plurality of wheels on the vehicle axle, wherein said at least one electric machine is configured to be operated as a generator;
   a foot-brake valve configured to be actuated via a brake pedal, said foot-brake valve having a braking-value transmitter and a brake-pedal actuator for generating a restoring force acting upon said brake pedal;
   an electronic control device configured to control said hydrodynamic or electrodynamic retarder, said service braking system, and said at least one electric machine, wherein a braking-force demand that is signaled via a displacement of the brake pedal is satisfied, in order of priority, by said at least one electric machine operating as said generator, said hydrodynamic or electrodynamic retarder, and said service braking system, wherein a distribution of braking force to said at least one electric machine, said hydrodynamic or electrodynamic retarder, and said service braking system is communicated to a driver of the vehicle as a haptically perceptible signal force that is superimposed, via the brake-pedal actuator, on the restoring force acting upon the brake pedal;
   said brake-pedal actuator being configured to operate electrically and including a rotationally or linearly displaceable transmission element; and,
   said transmission element is connected in an actuating manner to a brake lever of said brake pedal.

2. The braking system of claim 1, wherein said brake-pedal actuator is as an electric motor having a rotor shaft; and, said rotor shaft of said electric motor is connected in an actuating manner to said brake lever of said brake pedal.

3. The braking system of claim 1, wherein said brake-pedal actuator is an electromagnet which is connected in an actuating manner to said brake lever of said brake pedal.

4. A method for controlling a braking system of a motor vehicle having a vehicle axle and a plurality of wheels on the vehicle axle, the braking system having a plurality of components including a service braking system, an endurance braking system, and at least one electric machine, the service braking system having friction brakes being configured to be actuated by a pressure medium, the endurance braking system being configured as a hydrodynamic or electrodynamic retarder, the at least one electric machine being connected in a transmitting manner to the plurality of wheels on the vehicle axle and configured to be operated at least as a generator, and a foot-brake valve configured to be actuated via a brake pedal, wherein the foot-brake valve has a braking-value transmitter and a brake-pedal actuator for generating a restoring force acting upon the brake pedal, wherein the method comprises:

controlling the plurality of components of the braking system via an electronic control device to satisfy a braking-force demand, in order of priority, by the electric machine in generator operating mode, by the retarder and by the service braking system; and, communicating an occurrence of a distribution of a braking force to the plurality of components of the braking system to a driver of the motor vehicle through a haptically perceptible signal force that is superimposed, via the brake-pedal actuator, on the restoring force acting upon the brake pedal when there is a change in the distribution of the braking force to the components of the braking system.

5. The method of claim 4 further comprising:

when at least one of the plurality of components of the braking system is activated or deactivated, superimposing the haptically perceptible signal force on the restoring force acting upon the brake pedal via the brake-pedal actuator.

6. The method of claim 4, wherein the haptically perceptible signal force that is superimposed on the restoring force acts as at least a pulse-type increase in the restoring force.

7. The method of claim 6 further comprising:

applying the haptically perceptible signal force in a form of pulse-type signal forces, wherein, when there is a change in the distribution of the braking force, at least one of the pulse-type signal forces differs from at least another one of the pulse-type signal forces with respect to at least one of number, strength, and duration.

8. The method of claim 4 further comprising applying the haptically perceptible signal force in a form of one or more oscillation sequences perceivable as a vibration on the brake pedal which each includes a plurality of oscillations of the restoring force.

9. The method of claim 8, wherein, when there is a change in the distribution of the braking force, the oscillation sequence applied differs from another oscillation sequence of the one or more oscillation sequences with respect to at least one of frequency, amplitude, and duration.

10. The method of claim 4, wherein a displacement of the brake pedal signals the braking-force demand.

\* \* \* \* \*